United States Patent
Nakamura et al.

(10) Patent No.: US 7,677,643 B2
(45) Date of Patent: Mar. 16, 2010

(54) BODY FRAMEWORK CONSTRUCTION

(75) Inventors: Takuo Nakamura, Okazaki (JP);
Hayami Nakagawa, Anjo (JP);
Katsuhiko Takashina, Okazaki (JP);
Hiroaki Kano, Okazaki (JP); Junichi Yanase, Nagoya (JP); Hiroyuki Seino, Okazaki (JP); Hideki Ito, Okazaki (JP);
Satoshi Yanagimoto, Susono (JP)

(73) Assignees: Mitsubishi Jidosha Kogyo Kabushiki Kaisha, Tokyo (JP); Mitsubishi Aluminum Company, Ltd, Tokyo (JP)

( * ) Notice: Subject to any disclaimer, the term of this patent is extended or adjusted under 35 U.S.C. 154(b) by 2 days.

(21) Appl. No.: 12/053,393

(22) Filed: Mar. 21, 2008

(65) Prior Publication Data
US 2008/0238148 A1 Oct. 2, 2008

(30) Foreign Application Priority Data
Mar. 30, 2007 (JP) .......................... P2007-094600

(51) Int. Cl.
*B62D 25/00* (2006.01)
(52) U.S. Cl. .......................... 296/187.08; 296/187.09
(58) Field of Classification Search ............ 296/187.08, 296/187.09, 203.02, 204, 193.07, 70, 193.09, 296/205, 29, 30
See application file for complete search history.

(56) References Cited

U.S. PATENT DOCUMENTS 7,188,893 B2 * 3/2007 Akasaka ................... 296/204
7,458,632 B2 * 12/2008 Yamada et al. ......... 296/193.07

FOREIGN PATENT DOCUMENTS

| CN | 1607137 A | 4/2005 |
|---|---|---|
| JP | 2006-143178 A | 6/2006 |

* cited by examiner

*Primary Examiner*—Joseph D Pape
(74) *Attorney, Agent, or Firm*—Birch, Stewart, Kolasch & Birch, LLP

(57) ABSTRACT

A body framework construction, includes: a rear seat cross member, extending in a transverse direction of a vehicle, in a rear part of a body in a lower part of a passenger compartment; a dash cross member upper, extending in the transverse direction, in a front part of the passenger compartment; and a backbone, configured into a thin, long shape having a closed cross section, and extending in a longitudinal direction of the vehicle. A front end portion of the backbone is connected to the dash cross member upper via a gusset, and a rear end portion of the backbone is joined to the rear seat cross member. The gusset is deformed more easily than the backbone relative to a force from a front.

7 Claims, 5 Drawing Sheets

BODY FRAMEWORK CONSTRUCTION

BACKGROUND OF THE INVENTION

1. Field of the Invention

The present invention relates to a body framework construction which is disposed at a lower part of a passenger compartment of a motor vehicle.

2. Description of the Related Art

As a framework construction of the related art which supports a lower part of a passenger compartment of a motor vehicle, there is a framework construction in which a front end portion of a floor panel which makes up a floor portion of the passenger compartment is joined to a dash panel disposed between an engine compartment and the passenger compartment and a rear end portion is joined to a rear seat cross member which extends in a transverse direction of the vehicle in the rear of a body. A tunnel portion where an exhaust pipe and a drive shaft pass are provided to pass through to the rear of the body is formed in a transversely central portion of a floor panel like the one described above. The tunnel portion has a U-shaped cross section and is configured to project upwards from the floor panel, and a backbone is mounted on an upper surface of the tunnel portion as a reinforcement member in such a manner as to extend in a longitudinal direction. The backbone is made, for example, of a plate-like member and is configured into a thin, long shape having a U-shaped cross section so as to extend along the tunnel portion in a matched fashion. A rear end portion of the backbone is disposed in front of the rear seat cross member, and the tunnel portion is disposed between the rear seat cross member and the backbone. (For example, refer to JP-A-2006-143178.)

In the vehicle body framework construction of the related art that has been described above, however, there have been the following problems inherent therein. Namely, since the floor panel is made up of the single plate member, it is easily subject to torsional deformation, and since the configuration is adopted in which the backbone intended to increase the strength is not directly joined to the rear seat cross member and is provided on only part of the floor panel, it has been difficult to secure high strength.

SUMMARY

It is therefore an object of the invention to provide a body framework construction which can prevent the torsional deformation of the floor panel portion and which can increase the strength of the body.

In order to achieve the object, according to the invention, there is provided a body framework construction, comprising:

a rear seat cross member, extending in a transverse direction of a vehicle, in a rear part of a body in a lower part of a passenger compartment;

a dash cross member upper, extending in the transverse direction, in a front part of the passenger compartment; and a backbone, configured into a thin, long shape having a closed cross section, and extending in a longitudinal direction of the vehicle, wherein a front end portion of the backbone is connected to the dash cross member upper via a gusset, and a rear end portion of the backbone is joined to the rear seat cross member, wherein the gusset is deformed more easily than the backbone relative to a force from a front.

The body framework construction may further include: backbone side panels, joined to both sides of the backbone in the transverse direction, respectively, so as to make up a floor part of the passenger compartment.

A front end portion of the gusset may be connected to the dash cross member upper via a dash panel that is disposed in the front part of the passenger compartment.

The dash cross member upper, the backbone and the rear seat cross member may be extruded members each having a cross-sectional shape which is continuous in the longitudinal direction. The gusset may include a bent plate member, and the gusset may include integrally: a horizontal portion that extends in the longitudinal direction and that is joined to the front end portion of the backbone; a sloping portion that extends obliquely upwards from a front end portion of the horizontal portion; and a vertical portion that extends upwards from a front end portion of the sloping portion and that is joined to the dash cross member.

DETAILED DESCRIPTION OF PREFERRED EMBODIMENTS

Hereinafter, a body framework construction according to a first embodiment of the invention will be described by reference to FIGS. 1 to 5. Note that front (front side), rear (rear side) and left to right width or transverse directions are defined based on a traveling direction of a motor vehicle, and a direction which is directed towards a transverse center of the motor vehicle is defined as an inward direction (inside) whereas a direction expanding from the center of the motor vehicle towards the transverse direction as an outward direction (outside). A direction in which gravity acts is defined as a downward direction (lower side), and a direction opposite to the direction in which gravity acts as an upward direction (upper side). In the figures, arrows X, Y and Z denote three directions which are at right angles to one another, the arrow X denoting the front of a body, the arrow Y denoting a left-hand side of the body as viewed in the transverse direction, the arrow Z denoting the upward direction of the body. In addition, in the following description, transversely symmetrical configurations will not fully be described but will be described only on either of a plurality of constituent members or components as required.

Figure 1:
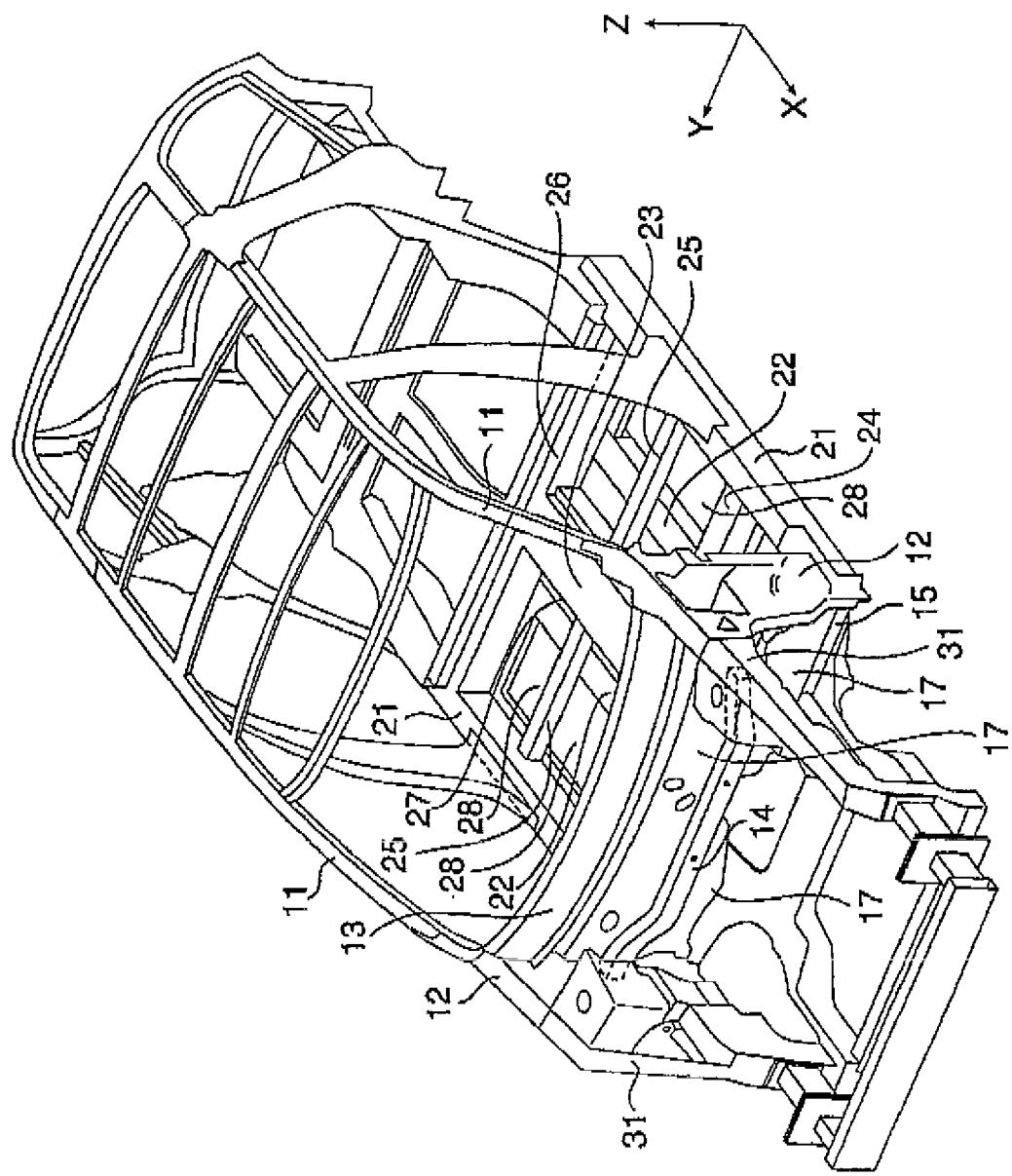
FIG. 1 is a perspective view showing a body framework construction according to an embodiment of the invention.
Figure 2:
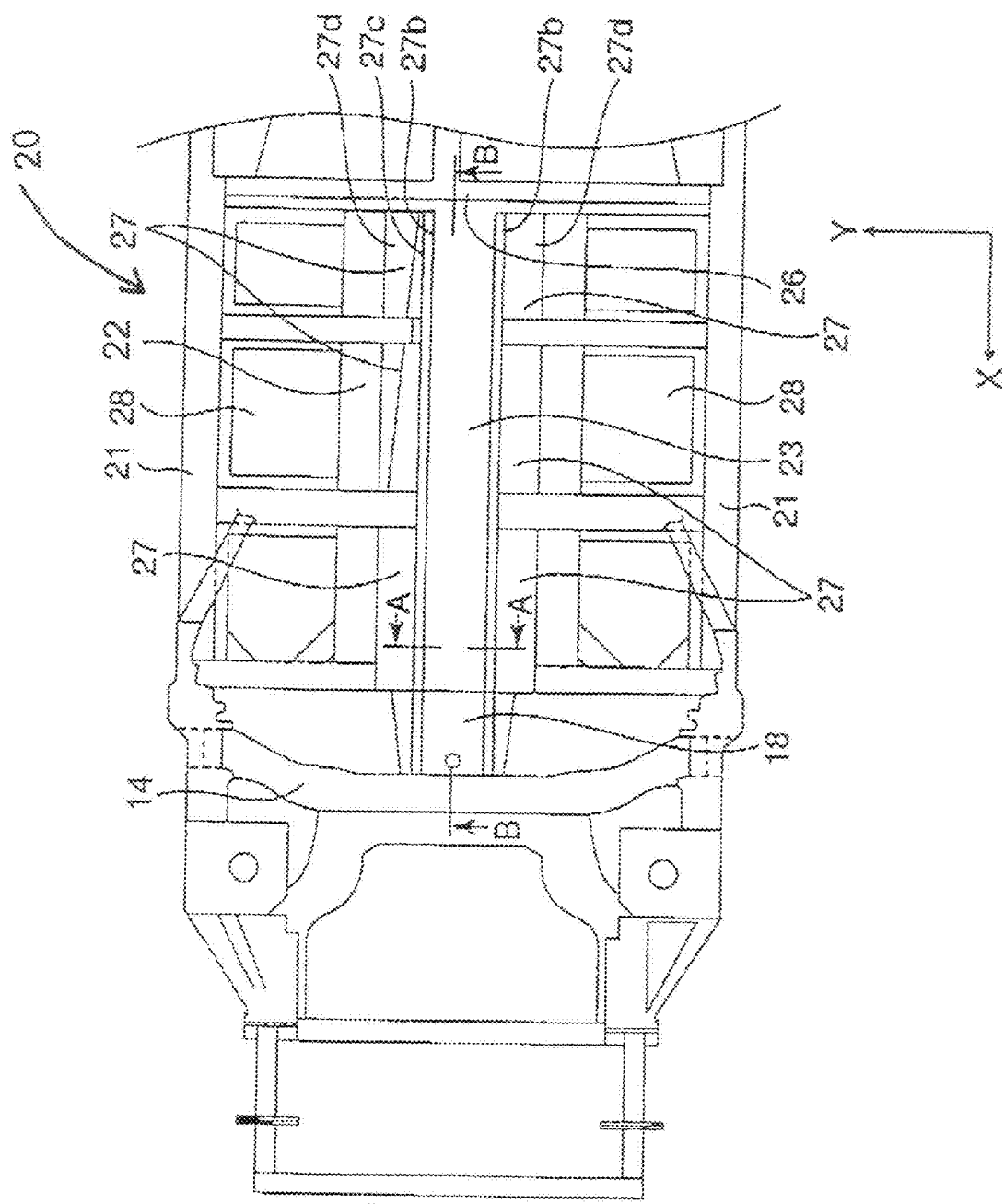
FIG. 2 is a plan view showing the same body framework construction.

FIGS. 1 and 2 show part of a body framework construction of a motor vehicle (a vehicle) according to the embodiment. A cowl top 13, a dash cross member upper 14 and a dash cross member lower 15 are provided in such a manner as to extend towards the transverse direction between left and right front pillar lowers 12 which are formed to extend downwards from corresponding left and right front pillars 11, respectively. The cowl top 13, the dash cross member upper 14 and the dash cross member upper 15 are provided in upper, middle and lower portions, respectively. The dash cross member upper 14 is disposed further downwards than the cowl top 13 and is curved in such a manner that a transversely central portion thereof lies downwards.

A dash panel 17 is provided between the left and right front pillar lowers 12 in such a manner as to extend transversely and vertically from below the cowl top 13 to reach the dash cross member lower 15 through a rear side of the dash cross member upper 14. The dash panel 17 is made of a plate-like pressed member of a light alloy casting such as a diecast metal material of aluminum and is disposed in such a manner as to constitute a partition between a passenger compartment and an engine compartment. The dash panel 17 is joined to the dash cross member upper 14 on a front surface thereof and is joined to backbone side panels 27, which will be described later, at a lower edge thereof. A portion of a transversely central portion of the dash panel 17 which lies further downwards than the dash cross member upper 14 is opened, and a gusset 18, which will be described later, is joined to a circumferential edge 17b of the opening 17a. Note that in a hollow member, an end face means an end face of a circumferential portion which surrounds a hollow portion.

Side sills 21 extend longitudinally from lower portions of the left and right front pillar lowers 12, respectively. Rear end portions of the side sills 21 are situated in front of rear wheels (not shown). Floor side members 22 are connected to an internal edge portion of the dash cross member lower 15 in positions further transversely inwards than the side sills 21 and extend towards the rear of the body.

A backbone 23 is provided in a transversely central portion in such a manner as to extend in the longitudinal direction of the body. A front end portion 23a of the backbone 23 is connected to a central portion of the dash panel via the gusset 18

Figure 3:
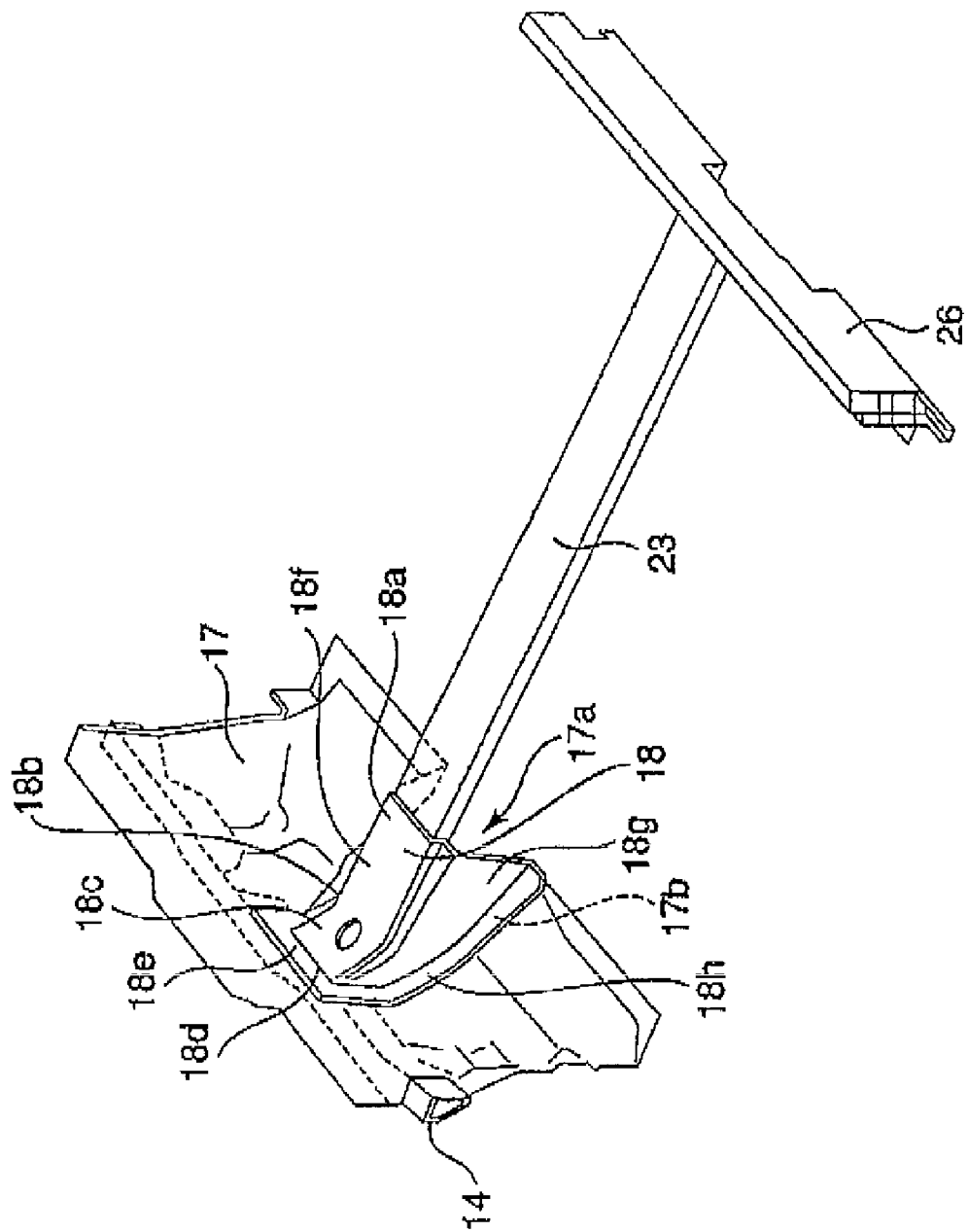
FIG. 3 is a schematic view showing part of the same body framework construction.
Figure 4:
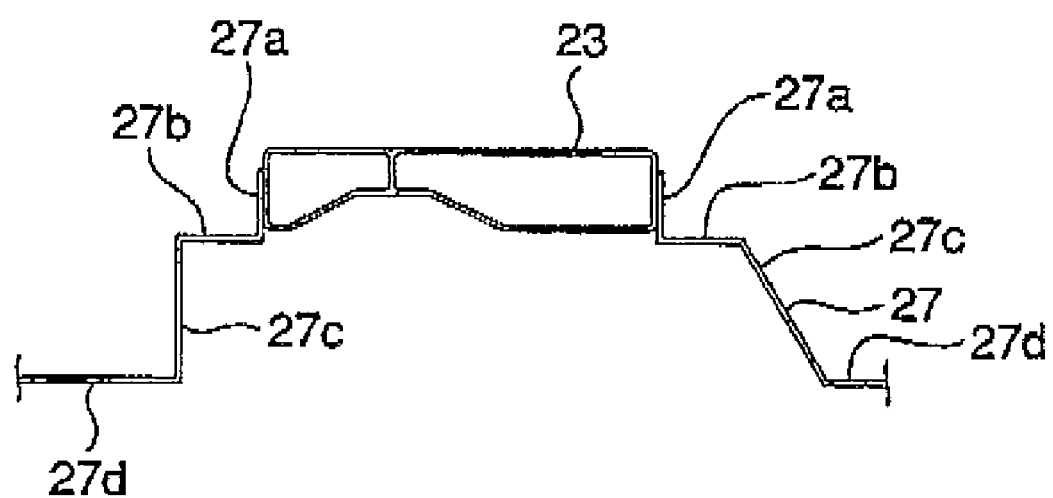
FIG. 4 is a schematic sectional view taken along the line A-A in FIG. 2 which shows part of the same body framework construction.
Figure 5:
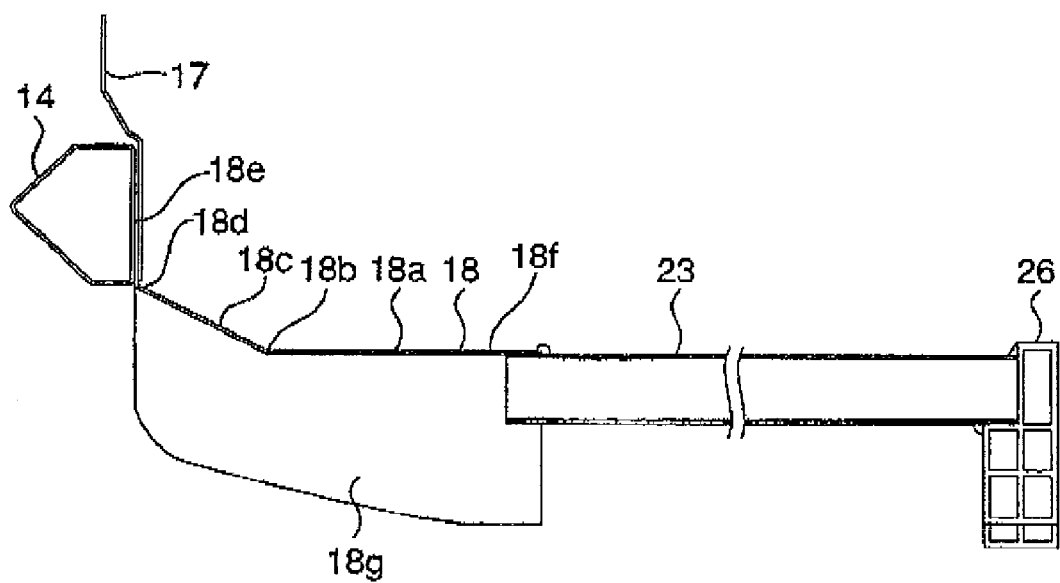
FIG. 5 is a schematic sectional view taken along the line B-B in FIG. 2 which shows part of the same body framework construction.

As is shown in FIGS. 3 to 5, the gusset 18 is made by bending a plate member made of a light alloy casting such as a diecast metal material of aluminum and includes integrally a horizontal portion 18a which extends in the longitudinal direction of the body, a sloping portion 11c which extends obliquely upwards from a front end portion of the horizontal portion 18a via a bent portion 18 b, and a vertical portion 18e which extends further vertically upwards from an upper front end portion of the sloping portion 18c via a bent portion 18d. The horizontal portion 18a and the sloping portion 18c each have an upper wall portion 18f and left and right side wall portions 18g and are each configured to have a U-shaped cross section in such a manner as to surround upper surface and side surfaces of the backbone 23. The vertical portion 18e is configured into a plate-like shape which extends upwards and in the transverse direction. This plate-like vertical portion 18e is held between a front surface portion of the circumferential edge 17b of the opening 17a in the dash panel 17 and a rear surface of the dash cross member upper 14, and is fixed to the dash panel 17 and the dash cross member upper 14, respectively. Here, the gusset 18 (the vertical portion 18e) may be fixed to the dash cross member upper 14 via the dash panel 17. Extending portions 18h, which extend from lower edges of the left and right side wall portions 18g of the horizontal portion 11a and the sloping portion 18c, are joined, respectively, to left and right members of the circumferential edge 17b of the opening 17a in the dash panel 17. The upper wall portion 18f of the horizontal portion 18a is fixed to an upper surface of the backbone 23 at the front end portion thereof. A lower surface of the horizontal portion 18a and the upper surface of the backbone 23 are joined together by means of welding at welding portions shown in the figures. When a load of a certain magnitude or larger is applied thereto from the front via the plate-like vertical portion 18e, the gusset 18, which is configured as has been describe above, can be bent to be deformed by the bent portions 18b, 18d, and therefore, when a large force is inputted to the vehicle due to it being involved in a frontal collision, the gusset 18 has a function to absorb impact energy by being so deformed so as to mitigate impact that would otherwise be transmitted to the passenger compartment via the backbone 23.

Various cross members 24, 25, 26 are provided between the left and right side sills 21 in such a manner as to extend in the transverse direction. Transversely outward end faces of the dash cross member lower 15 and the various cross members 24, 25, 26 are joined to internal wall surfaces 21a of the left and right side sills 21 by means of welding, and so on, respectively. Left and right end portions of the rear seat cross member 26 in the various cross members which is disposed in front of the rear wheels is connected to the side sills 21. End portions of the floor side members 22 and the backbone 23 are joined to the rear seat cross member 26. In addition, internal end faces of the cross members 24, 25, which are provided, respectively, at both ends in the transverse direction, are connected to the backbone 21 via the backbone side panels 27, which will be described later. Namely, as is shown in FIG. 4, an H-shaped framework construction is formed by the dash cross member upper 14, the gusset 1a, the backbone 23 and the rear seat cross member 26 being joined to each other.

The backbone side panels 27, which are made up of a light diecast metal such as a diecast material of aluminum, are provided between both left and right side surfaces and the floor side members 22, respectively. The backbone side panels 27 each include a mounting portion 27a which extends vertically to be fixed to either a left or right side surface of the backbone 23, a horizontally extending portion 27b which extends horizontally from a lower edge of the mounting portion 27a, an elevated surface portion 27c which extends downwards from a transversely outward edge portion of the horizontally extending portion 27b to the same level as a floor framework portion 20, and a horizontal panel portion 27d which is bent from a lower edge of the elevated surface portion 27c via a bent portion so as to extend horizontally towards the transversely outward direction. Transversely outward end portions of the horizontal panel portions 27 are joined to the floor side members 22, respectively.

Furthermore, floor panel members 28 are provided between the side sills and the floor side members 22, respectively.

The side sills 21, the floor side members 22 and the backbone 23, which extend in the longitudinal direction, and the dash cross member lower 15 and the various cross members 24 to 26, which extend transversely, are made to intersect each other so as to be combined into a ladder configuration to make up the floor framework portion 20. A floor part of the passenger compartment is made up of the floor framework portion 20, the backbone side panels 27 which are joined to the floor framework portion 20 and the floor panel members 28.

The various frame members 13 to 15, 21 to 26 which make up the floor framework portion 20 are made up of extruded members which are formed of a light diecast metal such as an aluminum alloy into thin, long shapes, and cross sections thereof are configured into, for example, polygonal configurations having a hollow portion which are continuous in the longitudinal direction with certain closed cross sections maintained therealong. The curvedly shaped cowl top 13 and dash cross member upper 14 are so made by being bent to be deformed over a range where the cross sectional shapes thereof are maintained constant continuously therealong.

In the framework construction 1 that is configured as has been described heretofore, when a large frontal force is applied to the dash cross member upper 14 from the front part of the body, the gusset 18 is deformed to absorb impact produced then. In addition, the rigidity is increased by the backbone 23 which is configured by the closed section.

The body framework construction 1 according to the embodiment provides the following advantages. Namely, the rigidity of the body is increased by joining together the rear seat cross member 26 of the closed cross section and the backbone 23 of the closed cross section. In addition, the occurrence of distortional deformation can be prevented more than the body framework construction in which the whole of a floor part of the body is formed integrally by configuring the floor part by joining the backbone side panels 27 to the backbone 23 which is made up of the thin, long shape having the closed cross section. Furthermore, when a large frontal force is inputted into the vehicle due to it being involved in a frontal collision, impact produced by such a collision can be absorbed by interposing the deformable gusset 18. Consequently, impact can be mitigated which would otherwise be transmitted to the passenger compartment.

In carrying out the invention, the constituent elements of the invention can be modified variously without departing from the spirit and scope of the invention, and specifically, the cross sectional shapes of the various frame members and the shapes of the panel members can be so modified.

What is claimed is:

1. A body framework construction, comprising:
    a rear seat cross member, extending in a transverse direction of a vehicle, in a rear part of a body in a lower part of a passenger compartment;
    a dash cross member upper, extending in the transverse direction, in a front part of the passenger compartment; and
    a backbone, configured into a thin, long shape having a closed cross section, and extending in a longitudinal direction of the vehicle, wherein a front end portion of the backbone is connected to the dash cross member upper via a gusset, and a rear end portion of the backbone is joined to the rear seat cross member,
    wherein rigidity of the backbone is greater than rigidity of the gusset so that the gusset is deformed more easily than the backbone relative to a force from a front of the vehicle.

2. The body framework construction according to claim 1, further comprising:
    backbone side panels, joined to both sides of the backbone in the transverse direction, respectively, so as to make up a floor part of the passenger compartment.

3. The body framework construction according to claim 1, wherein
    a front end portion of the gusset is connected to the dash cross member upper via a dash panel that is disposed in the front part of the passenger compartment.

4. The body framework construction according to claim 1, wherein
    the dash cross member upper, the backbone and the rear seat cross member are extruded members each having a cross-sectional shape which is continuous in the longitudinal direction, and
    the gusset includes a bent plate member, and the gusset includes integrally: a horizontal portion that extends in the longitudinal direction and that is joined to the front end portion of the backbone; a sloping portion that extends obliquely upwards from a front end portion of the horizontal portion; and a vertical portion that extends upwards from a front end portion of the sloping portion and that is joined to the dash cross member.

5. A body framework construction, comprising:
    a rear seat cross member, extending in a transverse direction of a vehicle, in a rear part of a body in a lower part of a passenger compartment;
    a dash cross member upper, extending in the transverse direction, in a front part of the passenger compartment;
    a backbone, configured into a thin, long shape having a closed cross section, and extending in a longitudinal direction of the vehicle, wherein a front end portion of the backbone is connected to the dash cross member upper via a gusset, and a rear end portion of the backbone is joined to the rear seat cross member; and
    backbone side panels, joined to both sides of the backbone in the transverse direction, respectively, so as to make up a floor part of the passenger compartment,
    wherein the gusset is deformed more easily than the backbone relative to a force from a front of the vehicle.

6. A body framework construction, comprising:
    a rear seat cross member, extending in a transverse direction of a vehicle, in a rear part of a body in a lower part of a passenger compartment;
    a dash cross member upper, extending in the transverse direction, in a front part of the passenger compartment; and
    a backbone, configured into a thin, long shape having a closed cross section, and extending in a longitudinal direction of the vehicle, wherein a front end portion of the backbone is connected to the dash cross member upper via a gusset, and a rear end portion of the backbone is joined to the rear seat cross member,
    wherein the gusset is deformed more easily than the backbone relative to a force from a front of the vehicle, and wherein
    the dash cross member upper, the backbone and the rear seat cross member are extruded members each having a cross-sectional shape which is continuous in the longitudinal direction, and
    the gusset includes a bent plate member, and the gusset includes integrally: a horizontal portion that extends in the longitudinal direction and that is joined to the front end portion of the backbone; a sloping portion that extends obliquely upwards from a front end portion of the horizontal portion; and a vertical portion that extends upwards from a front end portion of the sloping portion and that is joined to the dash cross member.

7. The body framework construction according to claim 1, wherein
    the backbone extends in the longitudinal direction of the vehicle at a center of the vehicle.

* * * * *